United States Patent [19]
Welter et al.

[11] Patent Number: 4,799,614
[45] Date of Patent: Jan. 24, 1989

[54] APPARATUS FOR ULTRASONIC WELDING OF WIRES

[75] Inventors: Curtis Welter, West Haven; Guillermo Coto, Monroe; Michael Patrikios, Stratford, all of Conn.

[73] Assignee: American Technology, Inc., Milford, Conn.

[21] Appl. No.: 36,477

[22] Filed: Apr. 9, 1987

[51] Int. Cl.$^4$ .................................................. B23K 1/06
[52] U.S. Cl. ...................................... 228/1.1; 156/580.2
[58] Field of Search ...................... 228/1.1, 44.3, 44.7; 156/580.2

[56] References Cited

U.S. PATENT DOCUMENTS

| | | |
|---|---|---|
| 3,053,124 | 9/1962 | Balamuth et al. |
| 3,328,610 | 6/1967 | Jacke et al. |
| 3,444,612 | 5/1969 | Pennings |
| 3,602,421 | 8/1971 | Spratt ................................. 228/1 |
| 4,596,352 | 6/1986 | Knapp ................................. 228/1.1 |

FOREIGN PATENT DOCUMENTS 3151151  6/1983  Fed. Rep. of Germany ....... 228/1.1

Primary Examiner—Nicholas P. Godici
Assistant Examiner—Karen Skillman
Attorney, Agent, or Firm—Kramer, Brufsky & Cifelli

[57] ABSTRACT

Apparatus is provided for ultrasonic welding of wires which include a welding tip of a standard shaped readily machineable cross section with no concave surfaces. The welding tip is rotatable about an ultrasonic horn to present several alternative available worksurfaces. The worksurface in use defines a wall of the compression chamber into which wires to be welded are inserted. An anvil, a support, and a gathering tool each define an additional surface of the compression chamber. The position of each of these elements is adjustable thereby allowing for adjustment in two dimensions of the cross section of the compression chamber. This allows for the welding of various sizes or numbers of wires.

13 Claims, 2 Drawing Sheets

APPARATUS FOR ULTRASONIC WELDING OF WIRES

BACKGROUND OF THE INVENTION

1. Field of Invention

This invention relates to an apparatus for the ultrasonic welding of wires.

The apparatus includes a tip and associated means allowing for adjustment to accommodate different diameters of wire to be welded while maintaining a tight grip around the wires during the welding process to avoid spreading or splaying of the wires during the welding process. Further, the tip is rotatable to provide several alternative and interchangeable work surfaces on a standard-shaped readily machineable cross section, thereby allowing for a longer total worklife and a reduced cost of manufacture.

2. Description of the Prior Art

Wires may be ultrasonically welded to one another by placing the ends of the wires 7 firmly overlapping each other in a closed channel 1 formed between an ultrasonic welding tip 3 and a stationary support anvil 5 (as shown, e.g., in FIG. 1) and applying ultrasonic energy to the tip. The energy should be applied so that the tip vibrates parallel to the longitudinal axis of the wires to be welded, to intermolecularly bond the wire ends.

In order to assure that the vibrational energy is efficiently transmitted to the wires or workpiece, both the tip and the anvil have a serrated worksurface 9 for holding the wires or workpiece firmly in place.

Methods of generation of ultrasonic vibration are wellknown in the prior art (e.g., U.S. Pat. Nos. 3,053,124; 3,328,610; 3,444,612; and 3,602,421). A typical frequency of vibration may be twenty thousand cycles per second.

In order to prevent spreading or splaying of the wire or workpiece during the welding process, the wire or workpiece should be tightly confined within a compression chamber. Further, any change in the number or size of these wires or workpieces requires adjustment of the cross-sectional area of this chamber. It is desirable that this adjustment be done without the replacement of apparatus. Additionally, it is desirable that multiple available worksurfaces be provided in order to quickly replace any exhausted worksurfaces. This should be accomplished with easily machineable simply-shaped apparatus.

Along these lines, the device as shown in FIG. 1 has a number of disadvantages. First, the wires to be welded are held in a channel formed by the intersection of a notch 4 on the tip 3 and a notch 2 on the anvil 5. As the size of the mating notches 2,4 is not adjustable and the tolerance between the tip 3 and the anvil 5 along with the firmness of the serrated worksurface 9 on the workpiece or wires 7 is critical in order to prevent the wire end from extruding or splaying while in a plastic state during the welding process, a given tip is generally applicable to the welding of only one size of wire, or a limited number of ends thereof. A machine shop having occasion to weld various sizes of wires would have to obtain ultrasonic welding tips of corresponding notch sizes.

Secondly, the tip and the anvil have intricate shapes and the notches therein must be manufactured within close tolerances, thereby adding to manufacturing costs.

Lastly, the welding tip 3, as shown in FIG. 1, presents only two possible work surfaces 9. After the first worksurfaces 9 is exhausted, in that the gripping serrations and dimensional tolerances become worn after repeated use, the tip is rotated 180° to present a second serrated, gripping worksurface. After this second worksurface is exhausted, the tip is discarded.

As previously described, the manufacturing costs of this tip are high and a supply of tips with varying sizes of notches must be kept by the well-supplied machine shop; therefore, the frequent discarding of these tips may present both a financial and a procurement concern.

SUMMARY OF THE INVENTION

In accordance with the present invention, an ultrasonic welding apparatus is provided which utilizes a movable gathering device between the anvil, a stationary support, and the welding tip to allow for adjustably accommodating different sizes and numbers of wire workpieces to be welded. The welding tip is also redesigned to be long-wearing, simply-shaped in cross section, and easily manufactured. The tip presents several alternate and interchangeable worksurfaces at adjoining corners, which are made available, when needed, by rotating the tip.

The cross section of welding tip is preferably a square, but could also be any convex polygon, preferably a regular polygon. A convex polygon is one in which a straight line between any two points within the polygon does not cross the boundaries of the polygon. This cross sectional shape precludes any concave surfaces such as those defining the worksurface in FIG. 1 which allows for simple, inexpensive manufacturing. A regular polygon is one in which all sides are equal to each other, as are the angles formed thereby (e.g., a square). A welding tip of such a cross section can be rotated about its axis in order to present another worksurface without any adjustment of the axis position.

As indicated, four major parts are included in the apparatus of the present invention—an ultrasonic welding tip, an adjustable anvil against which the welding of the wires occur, and an adjustable gathering tool opposite to a support surface for confining the wire ends to be welded together between the anvil and welding tip. The anvil is adjustable to vary the serrated worksurface in contact with the bulk of the wires to be welded, which, in turn, is variable. All of these parts are of rectangular cross section. These parts are placed at ninety degree angles to each other, but are offset so the corners of adjacent parts do not contact each other. This arrangement forms a channel-shaped work area with a rectangular cross section, with each of the four parts contributing a single surface of the confined work area.

In order to assure efficient transmission of ultrasonic energy from the apparatus to the wire workpiece, the worksurfaces of the tip and the anvil are serrated. The relative position of the gathering tool to the support is adjustable thereby allowing for a work area of varying size according to the diameter or number of the wires to be welded. The adjustment of the serrated surface of the anvil to the tip can also be accomplished. Thus, a tight fit of the wire ends or workpiece in the work area to prevent splaying or extruding of the wires while in the plastic state during the welding process, is achieved, by adjustment of the gathering tool relative to the support, while wear reduction is achieved through rotation of the tip and adjustment of the work contact area of the anvil relative to the tip, preserving the holding serrations thereof for extended use.

The gathering tool and the tip can also freely swing away from their work position thereby allowing for easy insertion and removal of the wire workpiece.

Prior art methods are used to vibrate the tip ultrasonically parallel to the longitudinal axis of the wire workpiece. During the ultrasonic welding process, the tip is exposed to substantial wear and tear, thus smoothing the serrations of the worksurface resulting in inefficient gripping of the wires and transmission of ultrasonic energy to the ends. Therefore, the worksurface of the tip must be frequently replaced.

The tip in the present invention has a total of four alternative worksurfaces, one at each corner of the square shape in cross section. Upon the exhaustion of one worksurface, the tip may be rotated to present another worksurface. Further, the simple cross-sectional shape of the tip allows for a reduced cost of manufacture and more multiple worksurfaces as compared to previous designs.

As is shown in FIG. 1, the prior art discloses a tip with only two worksurfaces but with a more intricate shape thus having a higher manufacturing cost, a higher manufacturing rejection rate, and a lower number of worksurfaces. Indeed, the lower manufacturing tolerances due to the simple square cross-sectional shape of the tip of the present invention could result in a lower manufacturing rejection rate per worksurface, thus allowing more worksurfaces to be placed on a tip without causing an unduly high manufacturing rejection rate of the multi-worksurfaced tip.

BRIEF DESCRIPTION OF DRAWINGS

Further objects and advantages of the invention will become apparent from the following description and claims, and from the accompanying drawings, wherein:

DETAILED DESCRIPTION OF THE PREFERRED EMBODIMENT

Figure 1:
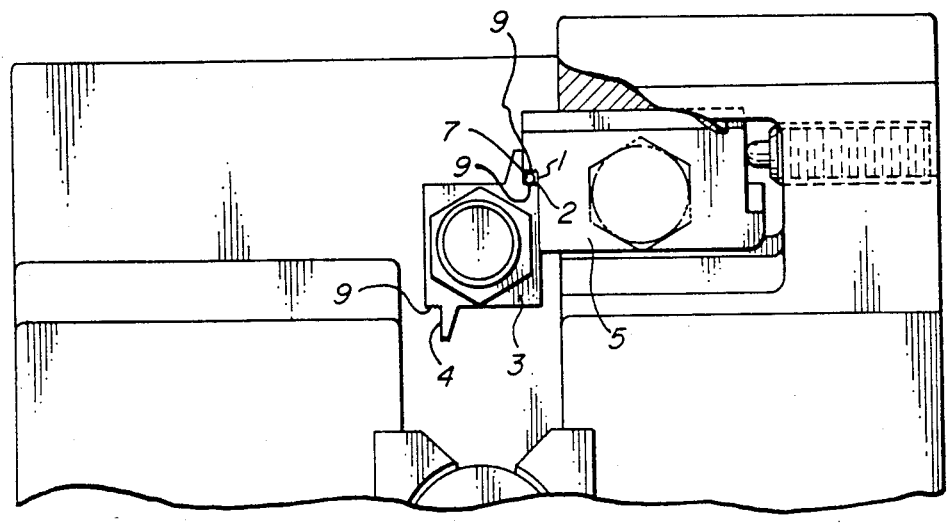
FIG. 1 is a front view in elevation, party in cross-section, of a typical prior art ultrasonic welding device.
Figure 2:
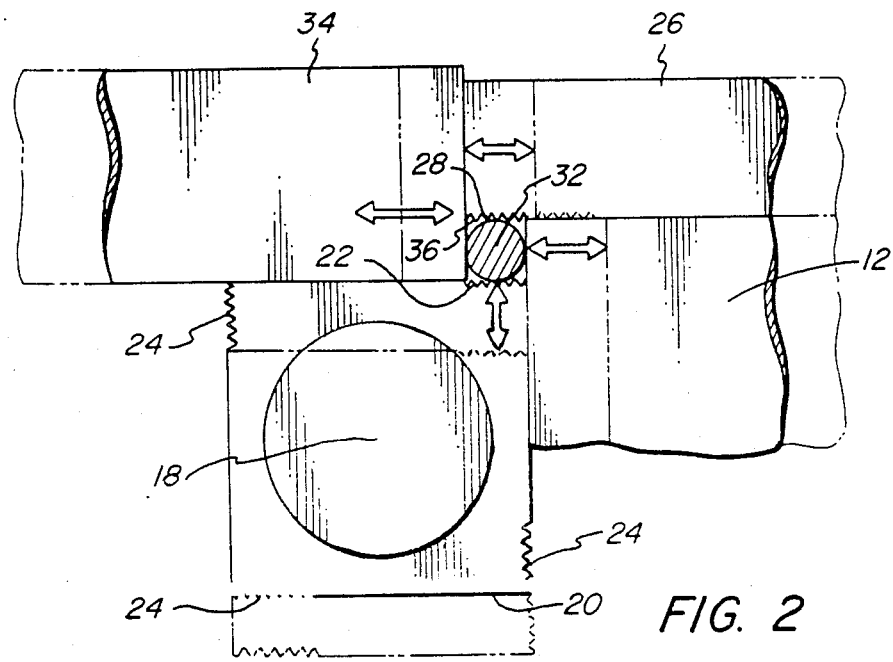
FIG. 2 is an enlarged front view in elevation, partly in cross-section, of the arrangement of the welding tip, anvil, support and gathering tool of the preferred embodiment of the present invention. Directions of travel of these four parts are illustrated.
Figure 3:
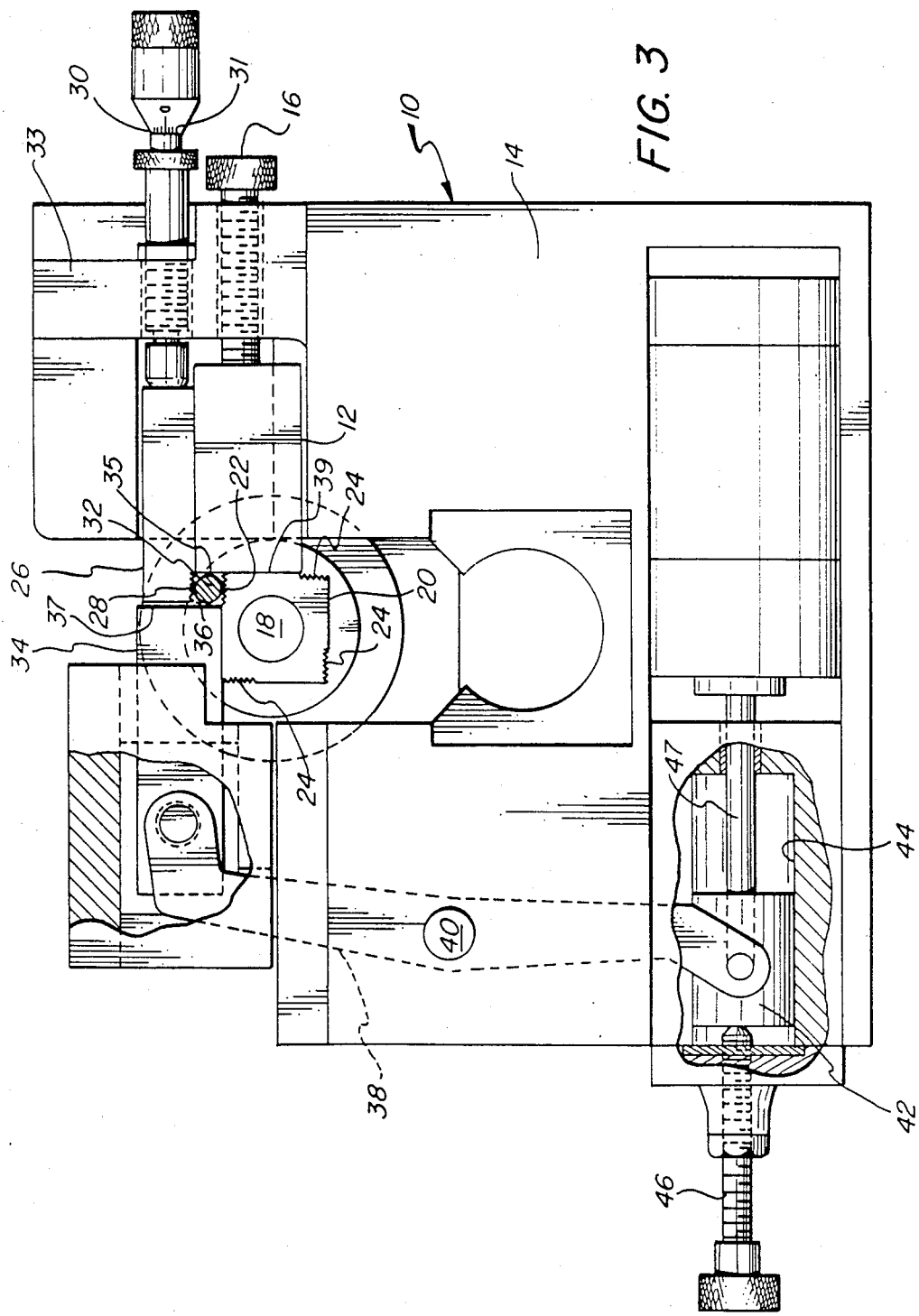
FIG. 3 is a front view in elevation, partly in cross-section, of the entire apparatus of the preferred embodiment, including the arrangement illustrated in FIG. 2.

Referring now to the drawings in detail wherein like numerals indicate like elements throughout the several views, the apparatus 10 of the present invention includes a support 12 seated on a main support structure or base 14. The position of support 12 on the base 14 is adjusted laterally by rotating the adjustment screw 16 rotatably fixed to an upright side of base 14 and connected to a threaded bore (not shown) in support 12. The support 12 is moved until it is flush with the side of a tip 20 connected to an ultrasonic welding horn. The tip 20 is square in cross section and has one serrated worksurface 22 and three auxiliary serrated worksurfaces 24 adjacent each corner. An anvil 26 having a serrated corner 28 is seated on support 12 and is adjusted via the rotation of an adjustment screw 30 provided with a vernier scale 31 to record the adjusted position of the anvil relative to the base 14. The screw 30 extends through an upright portion 33 of base 14 into a threaded bore in the anvil 26 and is rotated until the serrated worksurface 28 of the anvil 26 overlies and is opposite from and parallel to the serrated worksurface 22 of the tip 20. The tip 20 can be positioned towards and away from serrated work surface 28 as indicated by the dotted lines in FIG. 2.

A bundle of wire ends 32 to be welded are inserted into the partly enclosed notch or work area 35 defined by the serrated edges 28 and 22 and the adjacent edge surface 39 of support 12 and is fully enclosed by the edge surface 37 of a gathering tool 34 transforming the partly enclosed notch into a closed working area 36. The gathering tool 34 is pivotably attached to one end of a crank arm 38 which is rotatably mounted on a pivot pin 40 in base 14 intermediate its ends. The opposite end of the crank arm 38 is pivotably attached to piston head 42 slidable within a cylindrical channel 44 in base 14. The working position of the gathering tool 34 is adjusted by the rotation of the screw 46 threadedly received through a sidewall of base 14 which bears against piston head 42. Upon clockwise rotation of screw 46, piston head 42 is moved laterally into cylindrical channel 44, against, e.g., hydraulic dampening of its shaft 47 causing crank arm 38 to pivot in a counterclockwise direction about pin 40, moving gathering tool 34 away from the edge of anvil 26 on top of tip 20. Forced hydraulic return of piston shaft 47 and piston head 42, upon counterclockwise rotation of screw 46, causes gathering tool 34 to move towards the edge of anvil 26.

The adjustment of the relative positions of the tip 20, support 12, anvil 26 and gathering tool 34 is important so as to change the size of working area 36 thereby providing a tight fit and confinement around one or more of the wire ends 32 in the work area 36 so as to prevent splaying and plastic extrusion during the welding process. Further, this variable size of the working area 36 is accomplished without replacing machine parts, thereby reducing financial and procurement concerns.

After the wire end 32 is inserted and tightly enclosed in the work area 36 by the gathering tool 34, welding of the wire ends 32 is effected by the ultrasonic horn 18 vibrating the tip 20 in a direction parallel to the longitudinal axis of the wire ends 32 at a frequency of 20–40 KHZ.

During repeated use of the ultrasonic welding process, the serrated worksurface 22 of the tip 20 is exposed to substantial wear. Eventually, the serrated worksurface 22 of the tip 20 will become smooth, resulting in inefficient transmission of ultrasonic energy, due to the loss of grip on the article being welded, thereby rendering ineffective, ultrasonic vibration transmitted to the article. Upon exhaustion of a serrated worksurface 22 of the tip 20, the tip 20 may be rotated around the horn 18 in ninety degree increments so as to place any of the three auxiliary serrated worksurfaces 24 of the tip 20 into working position opposite to serrated edge 28 of anvil 26. These auxiliary serrated worksurfaces 24 of the tip 20 are identical to the serrated worksurface 22 of the tip 20 and thereby prolong the useful life of the tip 20 as a whole.

The length of the serrated edge 28 of anvil 26 introduced in the work area 36 may be varied by rotation of screw 30 to preserve the useful life thereof, if the entire gripping surface is not needed.

We claim:

1. An ultrasonic welding tip adapted to be connected to an ultrasonic horn to weld wire ends together comprising several alternative worksurfaces about the periphery of the tip successively available by rotation for contact with the wire ends to be welded, said tip having the cross sectional shape of a convex polygon substantially free of concave surfaces and said worksurfaces being found at the corners of said convex polygon.

2. The tip of claim 1 wherein the cross sectional shape of said tip is a square.

3. Ultrasonic welding apparatus adapted to weld the ends of a plurality of wires together, comprising:
an ultrasonic horn,
a welding tip connected to said horn having a cross sectional shape of a convex polygon substantially free of concave surfaces, said tip having several alternative worksurfaces located at least at the corners of said convex polygon successively available by rotation,
means defining a work area for confining the ends of said wires to be welded in an adjustably sized channel adjacent one of the worksurfaces of said tip, and
at least one wall of said channel being one of said worksurfaces of said welding tip.

4. The apparatus of claim 3 wherein said confining means includes:
an anvil with a worksurface facing into the interior of said channel opposite to said worksurface of said welding tip.

5. The apparatus of claim 4 wherein the position of said worksurface of said anvil with respect to the worksurface of said tip is adjustable laterally.

6. The apparatus of claim 5 wherein said confining means includes:
a gathering tool which forms a wall of said adjustably sized channel, said gathering tool being movable towards and away from said adjustably sized channel.

7. The apparatus of claim 6 wherein the working position of said gathering tool defined by its position relative to said worksurface of said tip is adjustable laterally with respect to said tip.

8. The apparatus of claim 4 wherein said confining means includes:
a support for said anvil which forms a wall of said adjustably sized channel.

9. The apparatus of claim 8 wherein the position of said support relative to said anvil is adjustable.

10. In an ultrasonic welding device for the ultrasonic welding of wire ends having:
an ultrasonic horn,
a rotatable welding tip attached to said ultrasonic horn, and
an anvil positioned against said tip such that a channel is formed therebetween for the holding of wire ends to be welded,
the improvement comprising:
said tip being of a cross sectional shape of a polygon substantially free of concave surfaces, said tip having any of said several available worksurfaces at the successive corners of said polygon, the alternative worksurfaces being made available through rotation of said tip about said horn.

11. In the device of claim 10, said worksurfaces being serrated.

12. In an ultrasonic welding device for the ultrasonic welding of wire ends having:
an ultrasonic horn,
a welding tip attached to said ultrasonic horn, and
an anvil positioned adjacent said tip such that a channel can be formed therebetween for the holding of wire ends to be welded,
the improvement comprising:
a gathering tool which forms at least one wall of said channel adapted to move towards and away from said channel and adjustable in its final working position relative to said tip, thereby allowing for adjustment of the size of said channel.

13. Ultrasonic welding apparatus adapted to weld the ends of a plurality of wires together, comprising:
an ultrasonic horn,
a welding tip connected to said horn having a cross sectional shape of a convex polygon with several alternative worksurfaces located at least at the corners of said convex polygon successively available by rotation,
means defining a work area for confining the ends of said wires to be welded in an adjustably sized channel adjacent one of the worksurfaces of said tip,
the confining means including a gathering tool which forms a wall of said adjustably sized channel, said gathering tool being movable towards and away from said adjustably sized channel wherein the working position of said gathering tool defined by its position relative to said worksurface of said tip is adjustable laterally with respect to said tip, and
at least one wall of said channel being one of said worksurfaces of said welding tip.

* * * * *

UNITED STATES PATENT AND TRADEMARK OFFICE
CERTIFICATE OF CORRECTION

PATENT NO. : 4,799,614

DATED : January 24, 1989

INVENTOR(S) : Curtis Welter, Guillermo Coto, Michael Patrikios and Rodney H. Hawkins It is certified that error appears in the above-identified patent and that said Letters Patent is hereby corrected as shown below:

On the Title Page, Item [75], in the section entitled "Inventors:", add

--Rodney H. Hawkins, Orange, Conn.--to the list of Inventors.

Signed and Sealed this

Eleventh Day of July, 1989

*Attest:*

DONALD J. QUIGG

*Attesting Officer*     *Commissioner of Patents and Trademarks*